Patented July 24, 1934

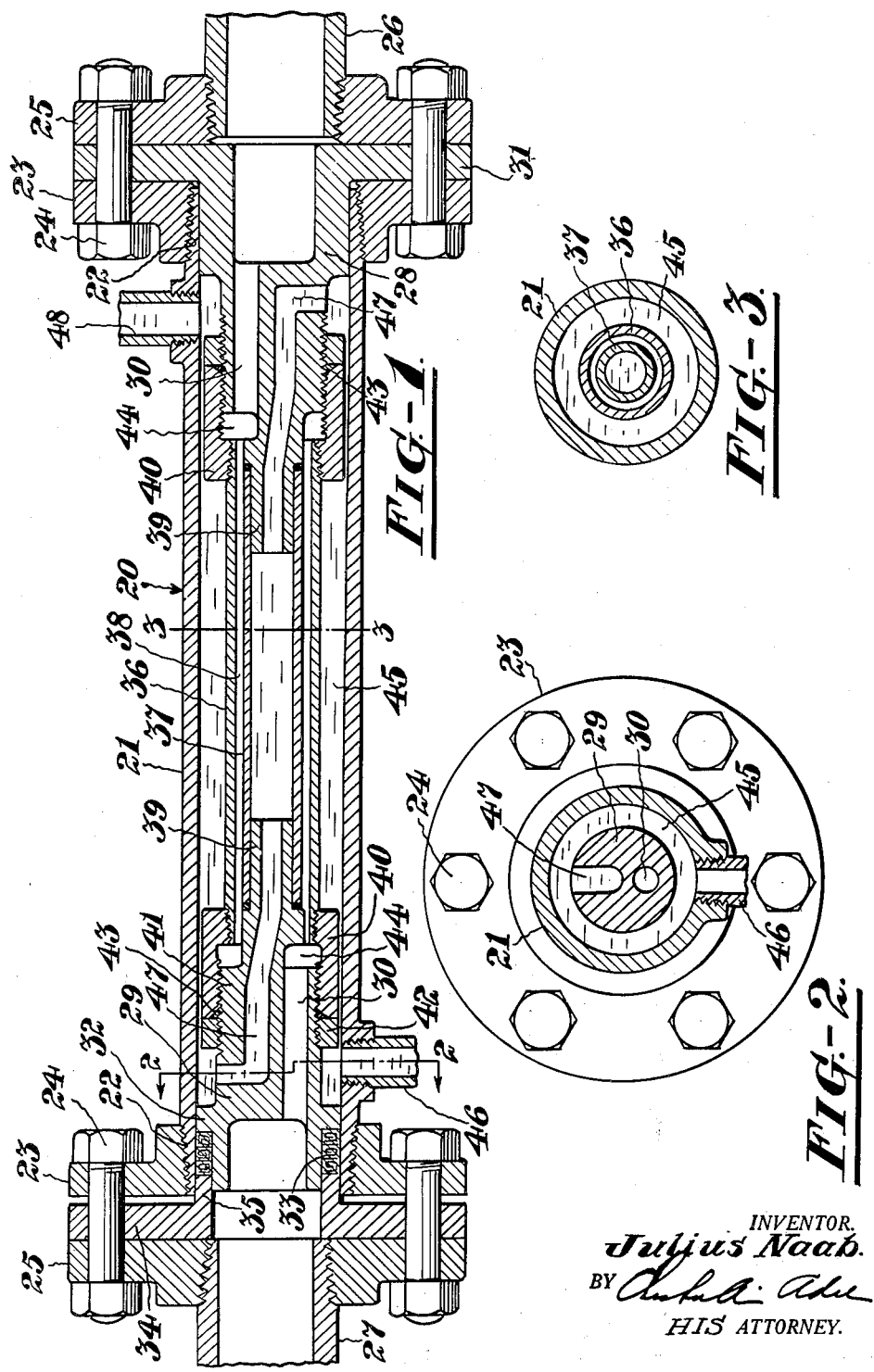

1,967,837

UNITED STATES PATENT OFFICE 1,967,837

HEAT EXCHANGER

Julius Naab, Easton, Pa., assignor to Ingersoll-Rand Company, Jersey City, N. J., a corporation of New Jersey Application October 19, 1933, Serial No. 694,237

2 Claims. (Cl. 257—246)

This invention relates to heat exchangers, and more particularly to a heat exchanger adapted to be interposed in the discharge line of a compressor to cool the discharge fluid prior to its admission into a storage chamber or before delivery to the machine which it actuates.

One object of the invention is to assure a maximum cooling effect with a minimum volume of cooling liquid.

Another object is to simplify the construction of devices of this character and, therefore, to cheapen the cost of production.

Other objects will be in part obvious and in part pointed out hereinafter.

In the drawing accompanying this specification and in which similar reference numerals refer to similar parts, Figure 1 is a longitudinal elevation, in section, of a heat exchanger constructed in accordance with the practice of the invention, and Figures 2 and 3 are transverse views taken through Figure 1 on the lines 2—2 and 3—3, respectively.

Referring more particularly to the drawing, 20 designates, in general, a heat exchanger comprising a casing 21. The casing is preferably of tubular shape. Its ends 22 are threaded for the accommodation of flanges 23 having bolts 24 arranged therein to secure the flanges 23 to flanges 25 carried by sections 26 and 27 of a compressor discharge pipe.

Of the pipe sections, that designated 26 may serve to convey the compressed fluid from the compressor to the heat exchanger, and the section 27 may afford communication between the heat exchanger and the point of application of the compressed fluid.

Disposed in the ends of the casing 21 are heads 28 and 29 having passages 30 for pressure fluid. The head 28, which extends into the end of the casing 21 adjacent the section 26 of the discharge line, is provided with a flange 31 which lies between the flanges 23 and 25 and is clamped securely therebetween by the bolts 24.

The head 29, shown as lying entirely within the end of the casing 21, has an external flange 32 of which the exterior surface may be in substantial body contact with the interior surface of the casing 21. The flange 32 which may, as illustrated, be located a short distance from the outer end of the head 29 serves as an abutment for packing material 33 encircling the outer end of the head.

A plate 34 interposed between the flanges 23 and 25 adjacent the head 29 carries a longitudinally extending flange 35 which seats against the packing material 33 to compress the packing material, the force required for that purpose being applied by the bolts 24.

Within the casing 21 are a pair of tubes 36 and 37 which are arranged in concentric relationship with respect to each other and, preferably, also with respect to the casing 21. The tube 37 which lies within the tube 36 is of smaller diameter than the tube 36 and the annular space defined by the tubes constitutes a passage 38 through which the compressed fluid flows from the discharge line 26 to the discharge line 27.

The tubes 36 and 37 are supported by the heads 28 and 29, each head being provided with a reduced inner end 39 which projects into the ends of the tube 37. As a preferred form of construction, the tube 36 is supported by bushings 40 threaded to the ends of the tube 36 and to intermediate threaded portions 41 of the heads 28 and 29. Nuts 42 threaded on the portions 41 seat against the bushings 40 and serve to compress packing material 43 inserted in the outer ends of the bushings 40 to prevent leakage of fluid along the threads of the bushings and the heads. Within the bushings 40 are recesses 44 which afford communication between the passages 30 and the annular passage 38.

The cooling liquid employed for extracting the heat of compression from the pressure fluid flowing through the annular passage 38 is introduced into an annular passage 45, defined by the casing 21 and the tube 36, through a connection 46 threaded into the casing 21 adjacent the head 29. Communication between the passage 45 and the interior of the tube 37 is afforded by passages 47 in the heads 28 and 29. A pipe 48 threaded into the casing 21, adjacent the head 28, affords an outlet for the cooling liquid.

In the operation of the device, the pressure fluid flowing from the discharge pipe section 26 passes through the passage 30 in the head 28, thence through the passage 38, in the form of an annular stream, to the pipe section 27. While passing through the passage 38 the heat of compression is extracted from the pressure fluid by the water flowing in a direction counter to that of the pressure fluid through the passage 45, the tube 37 and the passages connecting the tube 37 with the passage 45.

In practice, the present invention has been found to be a highly efficient device for the purpose specified. By passing the pressure fluid through the annular passage 38 the elements defining the said chamber may be conveniently exposed to the cooling liquid and the heat of compression may, therefore, be rapidly extracted from the pressure fluid.

I claim:

1. A heat exchanger comprising a casing having inlet and outlet openings for cooling liquid, a hollow member within the casing and cooperating therewith to define a passage for cooling liquid, a tube within the hollow member and cooperating with the hollow member to define an annular passage for pressure fluid, heads for the casing having conduits opening into the annular passage, projections on the heads having portions extending into the tube and passages to afford communication between the first said passage and the interior of the tube, and bushings threaded to the projections and to the hollow member to hold said hollow member in spaced relation with respect to the casing and the tube.

2. A heat exchanger comprising a casing having inlet and outlet openings for cooling liquid, a hollow member within the casing and cooperating therewith to define a passage for cooling liquid, a tube within the hollow member and cooperating with the hollow member to define an annular passage for pressure fluid, a head for one end of the casing having an abutment to engage the end of the casing, a head lying within the other end of the casing, there being conduits in the heads opening into the annular passage, projections on the heads having portions extending into the tube and passages to afford communication between the first said passage and the interior of the tube, and bushings threaded to the projections and to the hollow member to hold said hollow member in spaced relation with respect to the casing and the tube.

JULIUS NAAB.